UNITED STATES PATENT OFFICE.

ALEXANDER DANILEVSKY, OF ST. PETERSBURG, RUSSIA.

PROCESS OF PRESERVING FISH.

1,046,991.  Specification of Letters Patent.  Patented Dec. 10, 1912.

No Drawing.  Application filed May 18, 1912.  Serial No. 698,315.

*To all whom it may concern:*

Be it known that I, ALEXANDER DANILEVSKY, professor *emeritus*, doctor of medicine, a subject of the Czar of Russia, residing at No. 6 Nizhegorodskaya, St. Petersburg, Russia, have made certain new and useful Improvements in the Process of Preserving Fish, of which the following is a specification.

For the consumers of preserved sea and fresh-water fish it is of the highest importance that same shall reach the consumer in a condition most approaching the natural state of the fish. This condition is at present attained by freezing the fish, or by keeping it in cold storage. By the first method, however, the fish becomes deteriorated in the event of a thaw, besides which this method is not available in the warm seasons of the year, while the second method, namely cold storage, greatly increases the cost of the stored fish.

The usual known methods of salting fish by means of dry salt or of a concentrated solution of the same materially change the natural form and properties of the flesh of the fish and result in a coarse product, which is even prejudicial to health if consumed habitually.

A comparatively better product is the result of but slightly salting the fish. This product, however, is liable to local deterioration, due to the uneven distribution of the salt in the flesh; besides this method, requiring special arrangement for storing is a very expensive one.

The present invention has now for its object to provide a cheap process for producing an improved kind of slightly salted fish which is a great deal less salty than the existing sorts of saltish fish, and which at the same time possesses the natural properties of fresh fish to a very great extent and retains these properties for a long period. This improved process is carried out as follows:—
The fresh fish is gutted and cleaned or washed, after which, while still quite fresh, it is placed in a tank containing from 1 to 4 per cent. of diluted hydrochloric acid according to the sort of fish. Any other mineral acid, for instance sulfuric or phosphorous acid may be used instead of hydrochloric acid; hydrochloric acid is however preferred to all other acids. The fish is left in the acid liquid for from 10 to 60 minutes, during which time it is slowly stirred in order to allow the acid to come in contact with all the surfaces of the fish. The object of this treatment of the fish with dilute acid is to disinfect promptly and completely all the exposed surfaces of the fish, the acid quickly destroying all kinds of microörganisms, those of ordinary putrefaction and fermentation as well as those of the pathogenic groups. The acid easily penetrates not only beneath the gills, but also under each scale of the fish. This disinfection is sufficient and complete, as the internal tissue of the fish does not usually contain noxious bacteria.

Having treated the fish in the above described manner during the specified time, it is then taken out from the tank and as much as possible of the acid liquid is allowed to drain off, after which the fish is placed into a second tank, containing an aqueous solution of the following ingredients, viz:—from 6 to 12 per cent. of common salt, NaCl; from 6 to 10 per cent. of an alcoholic infusion of pepper and laurel leaves or other aromatic substances, from 0.5 to 1 per cent. of sodium acetate. The sodium acetate serves to convert the hydrochloric acid still remaining on the fish into sodium chlorid. The slight quantity of acetic acid which becomes free during the said reaction can only improve the taste of the product.

In the solution prepared as hereinbefore described, the fish can be preserved for a very long period and transported wherever required without the necessity of being sterilized and kept in hermetically sealed vessels.

Having now described my invention what I claim as new and desire to secure by Letters Patent is:—

1. A process for preserving fish, which consists in gutting and cleaning the fresh fish, steeping the cleaned, gutted fish for a short time in a germicidal solution of a mineral acid, and then transferring the fish into a weak solution of common salt.

2. A process for preserving fish which consists in gutting and cleaning the fresh fish, steeping the cleaned gutted fish for a short time in a germicidal solution of a mineral-acid, and then transferring the fish into a liquor composed of a weak solution of common salt with an addition of sodium acetate.

3. A process for preserving fish, which consists in gutting and cleaning the fresh fish, steeping the cleaned gutted fish for a short time in a germicidal solution of a mineral acid, and then transferring the fish into a liquor composed of a weak solution of common salt with an addition of an alcoholic infusion of an aromatic substance and sodium acetate, this last mentioned substance combining subsequently with the mineral acid remaining on the fish to form acetic acid.

4. A process for preserving fish, which consists in gutting and cleaning the fresh fish, steeping the cleaned gutted fish for a short time in a germicidal solution of hydrochloric acid, and then transferring the fish into a weak solution of common salt.

5. A process for preserving fish, which consists in gutting and cleaning the fresh fish, steeping the cleaned gutted fish for a short time in a germicidal solution of hydrochloric acid, and then transferring the fish into a liquor composed of a weak solution of common salt with an addition of sodium acetate.

6. A process for preserving fish, which consists in gutting and cleaning the fresh fish, steeping the cleaned gutted fish for a short time in a germicidal solution of hydrochloric acid, and then transferring the fish into a liquor composed of a weak solution of common salt with an addition of an alcoholic infusion of an aromatic substance and sodium acetate, this last mentioned substance combining subsequently with the hydrochloric acid remaining on the fish to form common salt and acetic acid.

7. A process for preserving fish, which consists in gutting and cleaning the fresh fish, steeping the cleaned gutted fish for a short time in a 1 to 4 per cent. solution of hydrochloric acid, and then transferring the fish into a liquor composed of from 6 to 12 per cent. aqueous solution of common salt, from 6 to 10 per cent. of an alcoholic infusion of pepper and an aromatic substance, and from 0.5 to 1 per cent. of sodium acetate.

In testimony whereof I affix my signature in presence of two witnesses.

ALEXANDER DANILEVSKY.

Witnesses:
H. A. SOVIAGIUNE,
L. J. WISCTMEWITZKY.